US010645616B2

(12) United States Patent
Bhattacharjee et al.

(10) Patent No.: US 10,645,616 B2
(45) Date of Patent: May 5, 2020

(54) CLOUD BASED ACCESS NETWORK (71) Applicant: NOKIA SOLUTIONS AND NETWORKS OY, Espoo (FI)

(72) Inventors: Parijat Bhattacharjee, Karnataka (IN); Vishnu Ram Omanakutty Amma Vijayaraghavan Nair, Bangalore (IN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/526,115

(22) PCT Filed: Nov. 11, 2014

(86) PCT No.: PCT/EP2014/074239
§ 371 (c)(1),
(2) Date: May 11, 2017

(87) PCT Pub. No.: WO2016/074702
PCT Pub. Date: May 19, 2016

(65) Prior Publication Data
US 2017/0325128 A1 Nov. 9, 2017

(51) Int. Cl.
H04W 28/16 (2009.01)
H04L 12/24 (2006.01)
H04W 16/32 (2009.01)
H04W 24/02 (2009.01)
H04W 92/12 (2009.01)

(52) U.S. Cl.
CPC .......... *H04W 28/16* (2013.01); *H04L 41/044* (2013.01); *H04L 41/0896* (2013.01); *H04W 16/32* (2013.01); H04W 24/02 (2013.01); H04W 92/12 (2013.01)

(58) Field of Classification Search
CPC .... H04W 28/16; H04W 16/32; H04L 41/044; H04L 4/0896
USPC ........................................................ 370/329
See application file for complete search history.

(56) References Cited

U.S. PATENT DOCUMENTS

2008/0134194 A1* 6/2008 Liu ....................... H04W 16/04
718/105
2012/0300615 A1 11/2012 Kempf et al.
2013/0017852 A1 1/2013 Liu et al.
2013/0073716 A1 3/2013 Dejana et al.
(Continued)

FOREIGN PATENT DOCUMENTS

WO 2015/169370 A1 11/2015

OTHER PUBLICATIONS

International Search Report and Written Opinion dated Jul. 28, 2015, corresponding to International Patent Application No. PCT/EP2014/074239.
(Continued)

Primary Examiner — Christopher R Crompton
(74) Attorney, Agent, or Firm — Squire Patton Boggs (US) LLP (57) ABSTRACT Information on a tier comprising given resources operationally connected to a set of remote radio heads and configured to process traffic to and from the remote radio heads is gathered and maintained (300). The usage of the tier resources on different connections and services is controlled (302). Communication (304) is maintained with respective apparatuses controlling other tiers regarding the use of resources of the tiers.

17 Claims, 7 Drawing Sheets (56) References Cited

U.S. PATENT DOCUMENTS

| | | | |
|---|---|---|---|
| 2013/0286954 A1* | 10/2013 | Ma | H04B 7/024 |
| | | | 370/329 |
| 2014/0031049 A1* | 1/2014 | Sundaresan | H04W 16/02 |
| | | | 455/447 |
| 2014/0105135 A1* | 4/2014 | Tellado | H04L 5/0037 |
| | | | 370/329 |
| 2016/0113018 A1* | 4/2016 | Li | H04W 72/0493 |
| | | | 709/226 |
| 2016/0198508 A1* | 7/2016 | Lee | H04W 72/02 |
| | | | 370/329 |
| 2016/0249268 A1* | 8/2016 | Usui | H04W 16/32 |
| 2018/0109964 A1* | 4/2018 | Mochizuki | H04W 16/08 |

OTHER PUBLICATIONS

Checko et al., "Cloud RAN for Mobile Networks—a Technology Overview", DTU Orbit—the Research Information System, Oct. 31, 2014, XP055203271.

Liang et al., "Wireless Network Virtualization: A Survey, Some Research Issues and Challenges", ResearchGate, Aug. 24, 2014, XP055203327.

Kulkarni et al., "Development of a Remote Lab with Microprocessor & DSP with FPGA Accelerator", 2013.

Korean Office Action corresponding to KR Appln. No. 10-2017-7015730, dated Feb. 10, 2020.

* cited by examiner

CLOUD BASED ACCESS NETWORK

FIELD OF THE INVENTION

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Communication networks are constantly under development. For example, the data rates supported by different radio communication networks are constantly increasing. High data rates are offered by present 3rd generation networks utilising HSPA (High Speed Packet Access) and $4^{th}$ generation Long Term Evolution (LTE) or the LTE-Advanced (LTE-A)) and future evolutions of these systems, for example.

The air interfaces of the current and future networks are capable of supporting much higher data rates as compared to wireless technologies of previous generations, effectively putting much more stress on the processing performed at the various network elements that support the air interface. The increase in data rates has made the use of smart phones more popular adding more data traffic volume to the networks.

As the demand for wireless data consumption keeps increasing, telecom companies and operators are looking at innovative ways of meeting user expectations and enhancing the user experience even further. One of the essential aspects of this push is the densification of the radio access networks by adding low power base stations or access points such as micro, pico and femto access points. These low power base stations require connections to the other parts of the networks. This requires significant investments.

One possible implementation of realising a flexible communication system is to utilise remote radio heads (RRH) and cloud based realisation of at least part of the infrastructure of the system. A remote radio head comprises a part of the elements of a conventional base station. Typically, a remote radio head comprises radio frequency equipment, analogue-to-digital/digital-to-analogue converters and up/down converters, for example. Rest of the base station functionality may be situated elsewhere. A cloud based solution may help reduce the footprint of individual base stations. It would also contain the complexity of the RRH to an extent making it essentially a plug and play device that would be cheaper to buy and easier to install and maintain. The cloud itself by definition is scalable and elastic with the ability to add and remove nodes dynamically. Efficient control of the resources of the cloud based system is a challenging task. Traditional clouds are designed to handle a large number of parallel processing tasks. However, the requirements of a communication system are different and controlling a cloud based communication system is not a trivial task.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus comprising: at least one processor; and at least one memory including computer program code, the at least one memory and the computer program code configured to, with the at least one processor, cause the apparatus at least to: gather and maintain information on a tier comprising given resources operationally connected to a set of remote radio heads and configured to process traffic to and from the remote radio heads; control the usage of the tier resources on different connections and services; communicate with respective apparatuses controlling other tiers regarding the use of resources of the tiers.

According to an aspect of the present invention, there is provided an apparatus comprising: at least one processor; and at least one memory including computer program code, the at least one memory and the computer program code configured to, with the at least one processor, cause the apparatus at least to: communicate with tier manager apparatuses each gathering and maintaining information on an instance of a Radio Access Network (RAN) tier comprising given resources operationally connected to a set of remote radio heads and configured to process traffic to and from the remote radio heads and controlling the resources of the tier; communicate with tier manager apparatuses each gathering and maintaining information on an instance of a Remote Radio Head (RRH) tier comprising given resources configured to process radio access network functions related to traffic to and from the remote radio heads and controlling the resources of the tier; relay control signalling between the tier manager apparatuses controlling different tiers and relay messaging between different instances of RAN tiers and different instances of RRH tiers.

According to an aspect of the present invention, there is provided an apparatus comprising: at least one processor; and at least one memory including computer program code, the at least one memory and the computer program code configured to, with the at least one processor, cause the apparatus at least to: manage and control storage and network resources used to realize one or more instances of Radio Access Network (RAN) tiers and Remote Radio Head (RRH) tiers; coordinate dynamic realization of communication network components as virtual instances utilizing the resources of the tiers and communicate with apparatuses controlling each tiers.

According to an aspect of the present invention, there is provided a method comprising: gathering and maintaining information on a tier comprising given resources operationally connected to a set of remote radio heads and configured to process traffic to and from the remote radio heads; controlling the usage of the tier resources on different connections and services; and communicating with respective apparatuses controlling other tiers regarding the use of resources of the tiers.

According to an aspect of the present invention, there is provided a method comprising: communicating with tier manager apparatuses each gathering and maintaining information on an instance of a Radio Access Network (RAN) tier comprising given resources operationally connected to a set of remote radio heads and configured to process traffic to and from the remote radio heads and controlling the resources of the tier; communicating with tier manager apparatuses each gathering and maintaining information on an instance of a Remote Radio Head (RRH) tier comprising given resources configured to process radio access network functions related to traffic to and from the remote radio heads and controlling the resources of the tier; relaying control signalling between the tier manager apparatuses controlling different tiers and relaying messaging between different instances of RAN tiers and different instances of RRH tiers.

LIST OF DRAWINGS

Embodiments of the present invention are described below, by way of example only, with reference to the accompanying drawings, in which.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE®, known also as E-UTRA), long term evolution advanced (LTE-A®), Wireless Local Area Network (WLAN) based on IEEE 802.11 stardard, worldwide interoperability for microwave access (WiMAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

Embodiments of the invention are applicable to communication system or any combination of different communication systems that support required functionalities.

Figure 1:
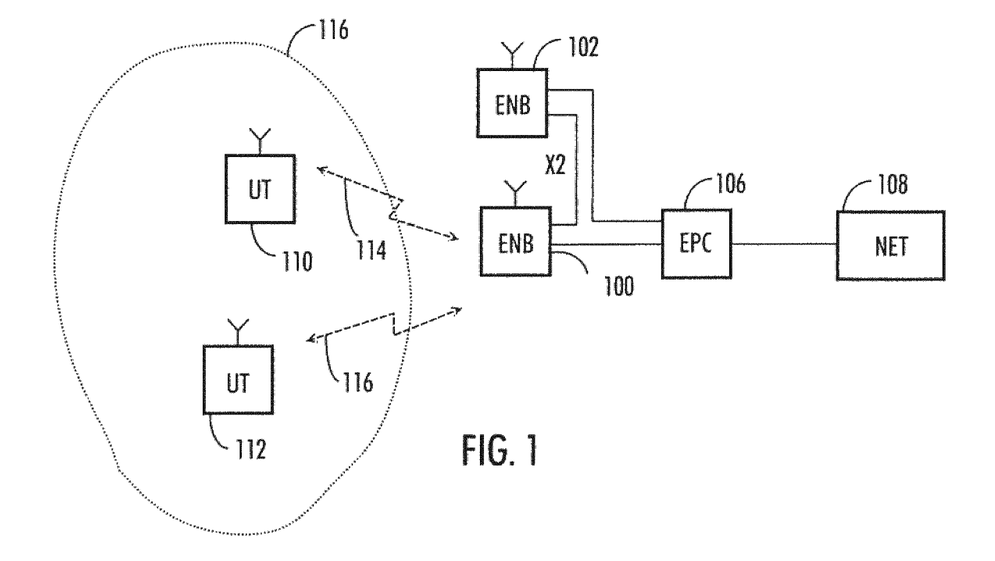
FIG. 1 illustrates an example of a communication environment.

FIG. 1 illustrates an example of an radio access network (RAN) architecture based on a long term evolution advanced (LTE Advanced, LTE-A) system. The LTE-A system is one of a system where embodiments of the invention may be applied.

FIG. 1 illustrates a simplified view of a communication environment only showing some functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

FIG. 1 shows eNodeBs 100 and 102 connected to an evolved Packet Core EPC 106 of a communication system. The eNodeBs may be connected to each other over an X2 interface. The eNodeB's form a part of the radio access network (RAN) of the communication system.

The eNodeBs 100, 102 that may also be called base stations of the radio system may host the functions for Radio Resource Management: Radio Bearer Control, Radio Admission Control, Connection Mobility Control, Dynamic Resource Allocation (scheduling). Depending on the system, the counterpart on the EPC side can be a serving gateway (S-GW, routing and forwarding user data packets), packet data network gateway (P-GW, for providing connectivity of user devices (UEs) to external packet data networks), and/or mobile management entity (MME), etc. The MME (not shown) is responsible for the overall user terminal control in mobility, session/call and state management with assistance of the eNodeBs through which the user terminals may connect to the network.

The communication system is also able to communicate with other networks, such as a public switched telephone network or the Internet 108. It should be appreciated that eNodeBs or their functionalities may be implemented by using any node, host, server or access point etc. entity suitable for such a usage.

The user terminals UT 110, 112 (also called user device, user equipment, terminal device, etc.) illustrate one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station.

The user terminal typically refers to a portable computing device that includes wireless mobile communication devices operating with or without a subscriber identification module (SIM), including, but not limited to, the following types of devices: a mobile station (mobile phone), smartphone, personal digital assistant (PDA), device using a wireless modem (alarm or measurement device, etc.), laptop and/or touch screen computer, tablet, game console, notebook, and multimedia device.

The user terminal (or in some embodiments a layer 3 relay node) is configured to perform one or more of user equipment functionalities. The device may also be called a subscriber unit, mobile station, remote terminal, access terminal, user equipment (UE) just to mention but a few names or apparatuses.

Further, although the apparatuses have been depicted as single entities, different units, processors and/or memory units (not all shown in FIG. 1) may be implemented.

The communication network described above may be realised using cloud services. In a cloud implementation, the some or all of the elements of a radio access network or a part of it may be realised with computing resources connected with each other with communication links. The computing resources may be realised with servers connected with each other with TCP/IP (Transmission Control Protocol/Internet Protocol) network, the Internet or other suitable network, for example. In addition, the EPC or a part of it may be implemented with cloud services.

When the cloud implementation of radio access network is considered the nature of the cloud changes based on ingress/egress functionality that is expected. Low latency requirements are often coupled with requirements for baseband processing of RF directly or of optical fibre input at the ingress/egress to the cloud on the user terminal bound interface. The EPC bound interface of the low latency cloud can be IP based.

Functionalities that have relaxed latency requirements such as the EPC also have easier ingress/egress requirements—the higher layers as well as the data are often IP based and standard IP based interfaces can be used on both the side towards the telecom infrastructure and on the side towards the internet.

A solution that helps to simplify the wireless network deployment while making it more robust will therefore be highly valued. The industry has shown increasing interest with using cloud based technologies for achieving these objectives.

When implementing a cloud based access network new mechanisms are required to optimally allocate the resources from a network perspective while simultaneously providing the end user with an optimal experience.

The cloud based access network needs to be capable of providing a mechanism that allows the hybrid deployment to be allocated optimally. It needs to be capable of providing the traditional cloud services such as elasticity, scaling, redundancy in addition to telecom functionalities and forward looking telecom features such as self-organizing networks in the new architecture.

There are several issues which must be taken into account in the cloud implementation of radio access functions. Communication systems such as 5G system architectures which are being developed are proposing more and more strict latency requirements (e.g.: below 1 ms) to increase the throughput. This is a challenge for hosting radio access network functions in cloud because guaranteeing such limits in a conventional cloud is a challenge.

Current interconnect strategies between processing elements of cloud do not take into account the low-latency requirements of RAN processing. This may lead to severe latency issues, call drops leading to disappointed customers when RAN moves to cloud. Another important consideration is that more and more RAN functions need coordination between cells. This means that inter-cell messaging is going to increase. Current strategies to host functions in cloud will exasperate this problem by introducing latencies. Once the RAN functions are hosted in the cloud, scaling these functions becomes the next challenge. The flexibility offered by the cloud cannot be compromised but at the same time the call-quality and data throughput of the end-user may not be compromised. This means that the scaling of the RAN functions has to be done in such a manner that resources are logically grouped together to incur minimal latency.

In an embodiment, the realization of a radio access network of a communication system in cloud environment is divided into two or more tiers where the tiers have different processing capabilities. A cloud realization of a communication system can be designed as tiers with each layer handling a specific set of functions. Higher layers can be based on generic cloud architecture; lower layers may be specifically designed with high processing power architecture designed to meet requirements of a radio access network. The lower layers may be designed as HPC (High Performance Computing) utilising multiprocessors, accelerators and high speed connections between different units. Each tier may comprise multiple instances of given functions, i.e. RRH Tiers may comprise several RRHs and RAN Tiers several RAN instances. In addition there may be more than one tiers of same level, i.e more than one RRH Tiers and RAN Tiers.

Figure 2:
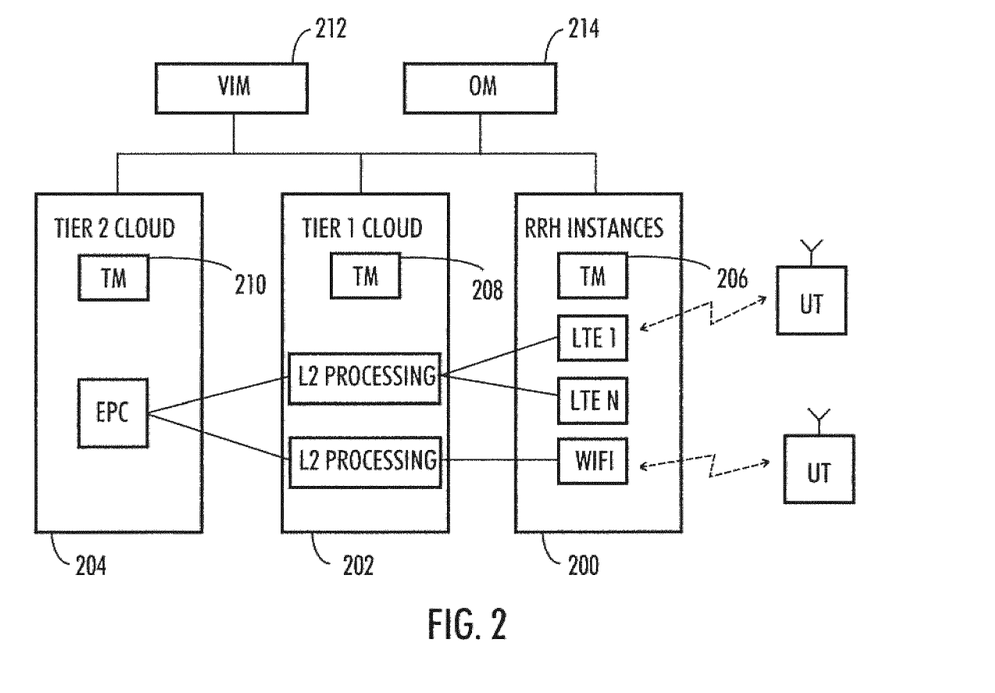
FIG. 2 illustrates an example of a possible cloud implementation of a communication system.

FIG. 2 illustrates an example of a possible cloud implementation of a communication system. In the example of FIG. 2, the system comprises a set of Remote Radio Heads (RRHs) in an RRH tier 200. The RRHs may utilise different access methods. The cloud configuration of the system is divided in tiers partly based on the latency requirements of different operations of the network. In this example, the cloud configuration is comprises two more tiers 202, 204. The first tier cloud 202 comprises low latency processing and RRH coordination. The first tier cloud 202 may support RRHs supporting different technologies such as Wi-Fi, LTE etc simultaneously. The first tier cloud 202 may use a HPC fabric internally to optimize the resource allocation for each technology and across technologies. The second tier cloud 204 comprises high latency or time tolerant operations such as EPC, for example.

In an embodiment, the lowest latency functions may be placed on the RRHs 200 itself. The L2 layer is placed in the first tier 202 on an intermediate level. This tier may be realised using HPC. The first tier may have highest processing capability of the tiers 202, 204. The physical location of the first tier may be determined on the basis of the information about the location and required quality of service of at least part of the one or more remote radio heads. The required quality of service of at least part of the one or more remote radio heads may comprise information on the allowed propagation delays when communicating with the remote radio heads, the number of missed calls, coverage areas, throughput, jitter, end-to-end call setup time and load on a particular remote radio head. The physical distance of the first tier cloud 202 from the RRHs 200 may be determined based on speed of propagation of signal from RRHs to the first tier over an optical interface, for example. Each first tier cloud 202 may support multiple RRHs as long as these RRHs fall within the physical distance limitation.

In an embodiment, the interfaces between different tiers may be realised using Common Public Radio Interface (CPRI™) standard, for example. The cloud may be capable of handling different interfaces. For example CPRI/OBSAI (Open Base Station Architecture Initiative) interface support may be used towards remote radio heads.

In an embodiment, the cloud implementation of a communication system may comprise a virtualization infrastructure management (VIM) 212 and an orchestration manager (OM) 214 of the cloud. The VIM may be configured to manage and control storage and network resources, collect and store fault information and collect and store information for capacity planning, monitoring and optimisation. The orchestration manager may be configured to orchestrate and manage infrastructure of the cloud implementation.

Figure 3:
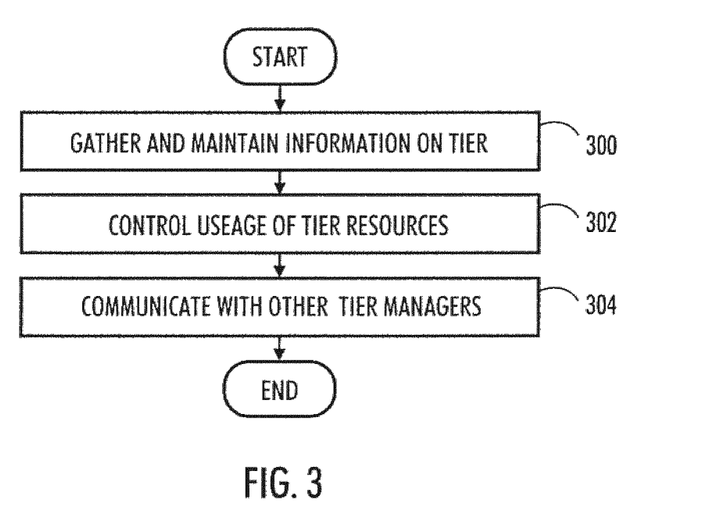
FIGS. 3 and 4 are flowcharts illustrating examples of the operation of apparatuses of some embodiments.

In an embodiment, each tier 200, 202, 204 comprises a tier manager apparatus 206, 208, 210 associated with each tier. The flowchart of FIG. 3 illustrates an example of the operation of the tier manager 200, 202, 204. The steps and related functions described are in no absolute chronological order, and some of the steps may be performed simultaneously or in an order differing from the given one.

In step 300, the tier manager is configured to gather and maintain information on a tier comprising given resources operationally connected to a set of remote radio heads and configured to process traffic to and from the remote radio heads. In an embodiment, the tier manager apparatus may gather and maintain information of its tier resources based on location, proximity, latency characteristics, mobility patterns and other characteristics. The tier manager apparatus may gather information of the tier resources based on static configuration as well as dynamic changes to the configuration or based on other dynamic characteristics not limited to active load in the system.

In an embodiment, the tier manager apparatus may maintain information regarding processing capabilities, current load and other parameters of interest regarding processing elements in the tier. An implementation of this could report this information periodically to the virtualization infrastructure management (VIM) of the cloud.

In step 302, the tier manager apparatus is configured to control the usage of the tier resources on different connections and services. In an embodiment, the tier manager apparatus may coordinate with the VIM the allocation of processing elements within the tier and facilitate decision of the instance of processing element within the tier which has to host a particular service request. This decision of the instance of processing element may be based on the parameters maintained and on inferences that can be derived from these parameters. VIM may run specific algorithms to aid the decision.

In an embodiment, the tier manager apparatus may coordinate the elastic nature of the tier along with the VIM, because they manage the available resources better or relinquish resources as the load reduces. This may be controlled by algorithms hosted in the VIM and tier manager apparatus.

In step 304, the tier manager is configured to communicate with respective apparatuses controlling other tiers regarding the use of resources of the tiers, i.e. other tier manager apparatuses.

In an embodiment, the communication with other tier manager apparatuses and the VIM may help in deciding inter-tier cooperation, for example but not limited to adjacency or connectivity. In an embodiment, the tier manager apparatus may cooperate with other tier manager apparatuses to maximize efficiencies across neighbouring tiers while individually working to optimize the local efficiency of processing within the tier.

In an embodiment, the tier manager apparatuses may all be peers or they may be structured to form a hierarchy consisting of parent, sibling and child nodes based on functionality or location.

In an embodiment, the tier manager apparatuses may coordinate to "borrow" resources from the connected tiers or allocate resources from connected tiers. This could be based on the parameters and algorithms hosted in the tier managers or VIMs. The VIMs may coordinate allocation of resources of a tier for the use of another tier and coordinate requests related to resources from tier managers.

In an embodiment, the tier manager apparatuses may be configured to generate statistics that enable the overall cloud RAN network to be self-healing, self-organizing and optimizing.

Inter-tier manager communication may be analysed to manually change the network configuration to enhance the efficiency of the interaction. Alternately, tier manager apparatus may expose hooks to a traffic manager component of the cloud implementation, the manager component being capable of optimization which will in-turn use operator specific rules to optimize the network. Alternately, tier manager apparatus may be configured to report these statistics periodically to VIM which in turn uses orchestration mechanisms to optimize the resources and interconnectivity.

In an embodiment, the tier manager apparatuses may be configured to manage the redundancy within the tier. The RAN cloud implementation can have redundant instances at any and all levels. Tier manager apparatuses may be configured to enable hot and cold swap of RRM, RRH and other RAN functionality from the primary to the redundant instance based on various triggers such as load thresholds, link failures, hardware failures, software failures, time based provisioning of RAN capacity, for example.

Tier manager apparatuses may track which resource is available, which is under maintenance or upgrade. This information may be used while deciding to allocate a service request. Tier managers may further expose hooks to a maintenance component, capable of upgrading the network, which in-turn will schedule outage or upgrade of specific processing units. Alternatively, tier managers may alternately report the faults to VIM which in turn coordinate updating and use orchestration mechanisms to enable healing.

In an embodiment, the cloud implementation of the communication system, may compromise a switching apparatus or switching mechanism between the tiers. The switch may be controlled using OpenFlow protocol by an Open Flow controller, for example.

OpenFlow is a communications protocol providing access to a forwarding plane of a network switch or router over the network. OpenFlow is a standard communications interface defined between the control and forwarding layers of a cloud architecture. OpenFlow provides direct access to a forwarding plane of network devices such as switches and routers, both physical and virtual. Open networking foundation (ONF) is an organization promoting and adopting software-defined networking and Open Flow.

Figure 4:
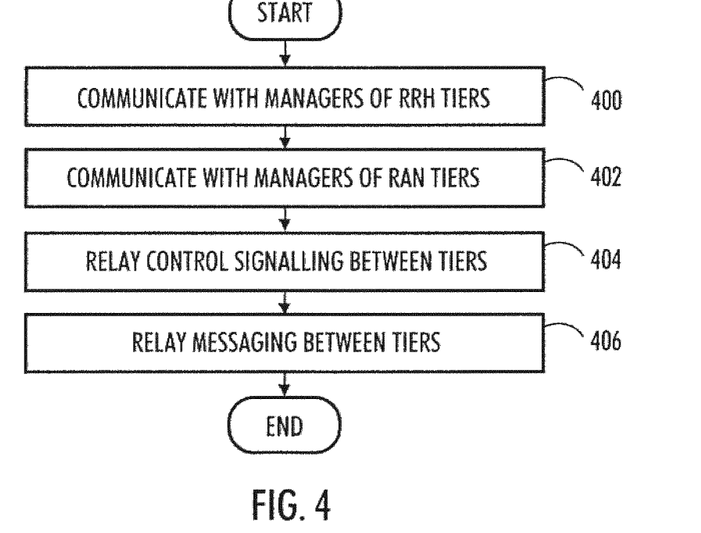

The flowchart of FIG. 4 illustrates an example of the operation of the switching mechanism of the cloud.

In step 400, the switching apparatus may be configured to communicate with tier manager apparatuses each gathering and maintaining information on a Radio Access Network (RAN) tier comprising given resources operationally connected to a set of remote radio heads and configured to process traffic to and from the remote radio heads and controlling the resources of the tier. There may be more than one instance of each RAN tier.

In step 402, the switching apparatus may be configured to communicate with tier manager apparatuses each gathering and maintaining information on a Remote Radio Head (RRH) tier comprising given resources configured to process radio access network functions related to traffic to and from the remote radio heads and controlling the resources of the tier. There may be one or more instances of RRH tiers.

In step 404, the switching apparatus may be configured to relay control signalling between the tier manager apparatuses controlling different tiers.

In step 406, the switching apparatus may be configured to relay messaging between different instances of RAN tiers and different instances of RRH tiers.

Thus, the switching apparatus may be configured by the VIM controller (e.g. neutron in openstack) for specific interconnectivity between RAN tiers, RRH tiers and both. In case of interconnectivity from and to RRH tiers, this may involve use of openflow components to control the switching of OBSAI/RP3 signalling.

In case of interconnectivity from and to RAN tiers, this may involve use of openflow components to control the switching of RAN signalling (such as inter-cell coordination messages or X2 messages, for example).

In the following an embodiment of the invention is illustrated with an example of an implementation of Dynamic Point Selection (DPS) Co-ordinated Multi-Point (CoMP). Dynamic Point Selection-Down Link-Coordinated Multi Point (DPS DL-CoMP) is an LTE-A feature that requires multiple cells to co-ordinate their transmission to a user terminal in order to ensure that the best link is transmitting at any point. In the version of DL-CoMP considered here, only one Transmission Point (TP) is active at any given time.

Advanced features like DPS often require coordination between multiple eNodeBs and schedulers which make them naturally suitable for the cloud based access network. In the case of DPS, the algorithm requires multiple TPs to be communicating with the same user terminal. The TPs are selected based on their channel quality towards the user terminal which translates to considerations for latency constraints, location and adjacency in our architecture.

Figure 5A:
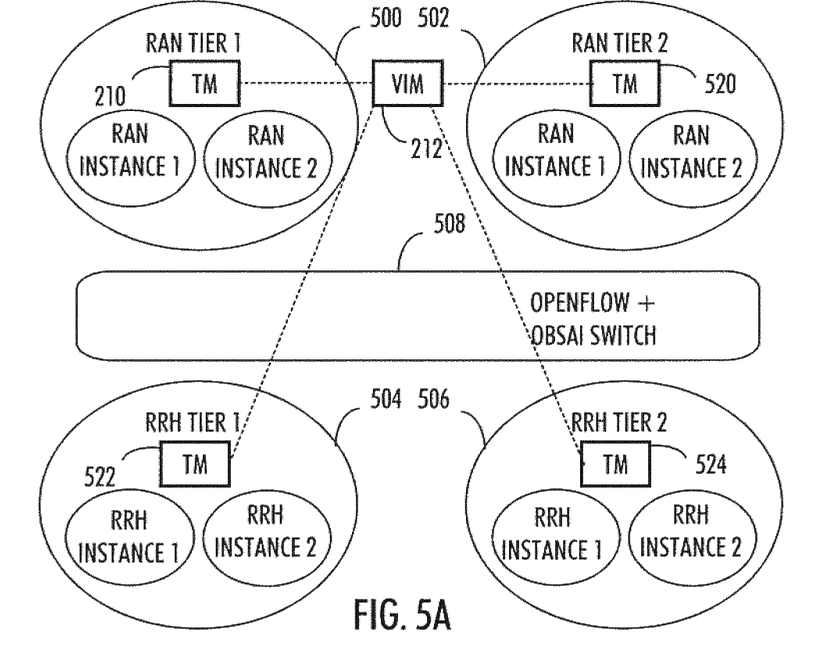
FIGS. 5A, 5B, 5C and 5D are illustrating some embodiments of the invention.

FIG. 5A illustrates the scenario of this example. The figure shows two RAN tiers 500, 502 and two RRH tiers 504, 506. Further, each RAN tier supports two RAN instances at least and likewise, each RRH tier supports at least two RRH instances. The switching apparatus 508 between the RAN tiers 500, 502 and the RRH tiers 504, 506 may be considered to be a switch that is capable of Openflow routing as well as OBSAI routing based on Openflow interactions, for example. Each tier comprises a tier manager apparatus 210, 520, 522, 524. The system comprises a virtualization infrastructure management VIM 212.

Figure 5B:
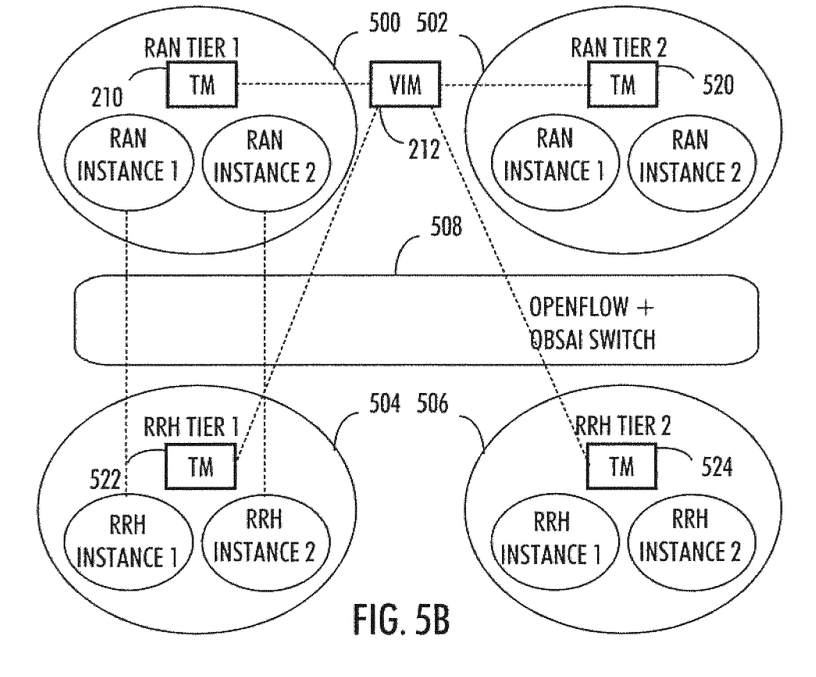

Assume a situation where DPS DL-CoMP is applied to a user terminal in the area where the RRH tiers are located. There are various alternatives to realise DPS DL-CoMP. FIG. 5B illustrates a case where the benefits of the Cloud based architecture can be utilized to the fullest extent. In this case, TP1 is assumed to be allocated on RAN tier 1 500 and utilizing RRH instance 1 on RRH tier 1 504. Here, TP2 also gets allocated to RAN tier 1 500. Moreover, the same RRH tier is also allocated RRH tier1 504 and the instance allocated is RRH instance 2.

If a RAN instance+RRH instance is considered loosely to constitute a conventional eNodeB, this case would be similar to a scenario where the two TPs are allocated on different cells on the same eNB chassis.

Figure 6A:
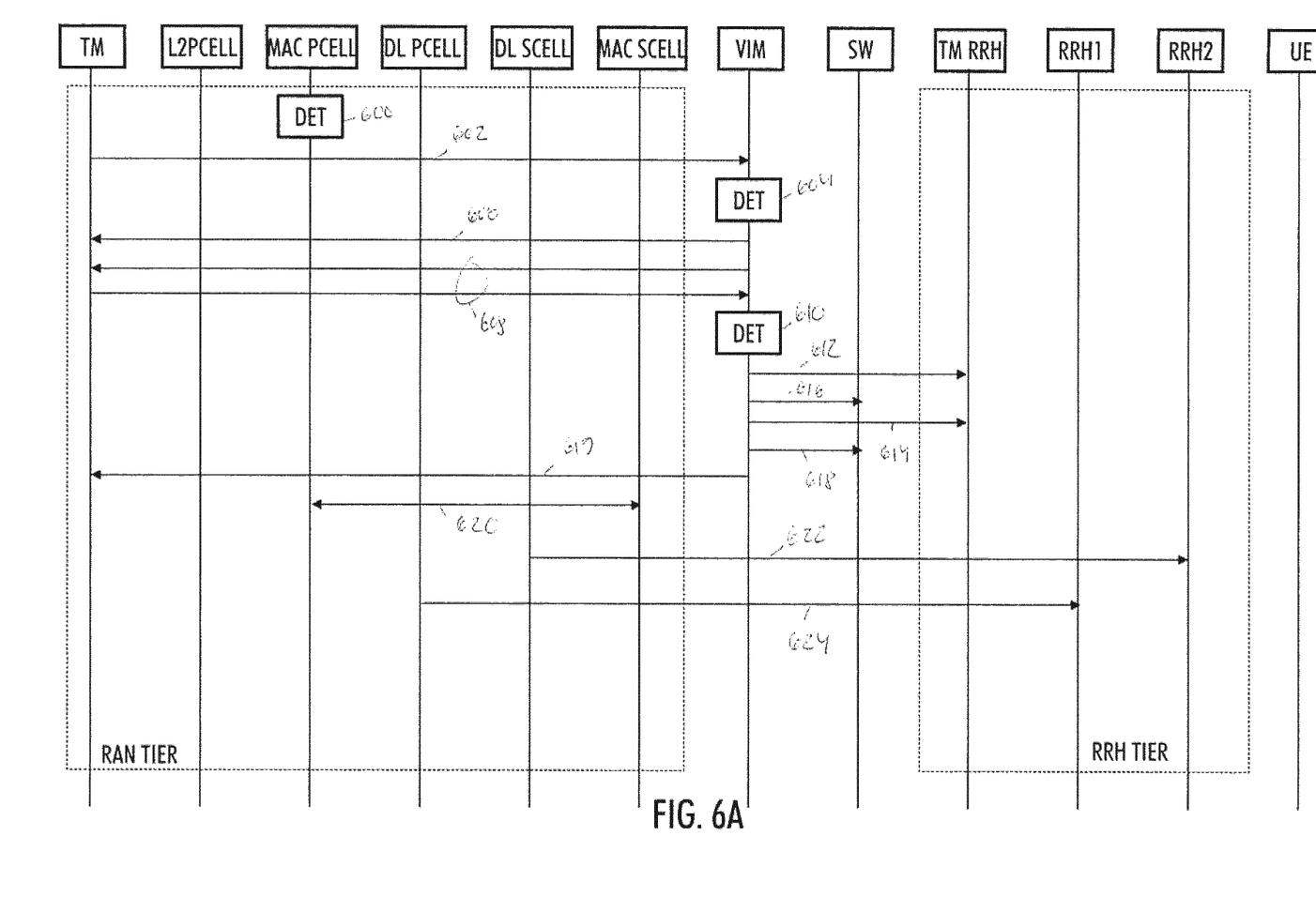
FIGS. 6A, 6B and 6C are signalling charts illustrating some embodiments of the invention.

The signalling chart of FIG. 6A illustrates an example of possible signal flow for this case. The signalling chart is simplified and not all possible signalling messages are shown.

In the example situation of FIGS. 5B and 6A, user terminal (UE) is already attached to the RRH instance 1 of RRH tier 1 504 with TP1 allocated on RAN tier 1 500. The best transmission points (TP) for the user terminal are determined 600 by specific Radio Resources Management RRM algorithms in RAN instance and tier manager. The Tier Manager 210 on RAN tiers1 initiates a request 602 in order to coordinate with the VIM to allocate an additional RAN Tier for the UE for DPS. In this example, VIM determines 604 the best RAN tier to use and the second TP is allocated 606 on the same RAN tier.

Once the RAN tier has been allocated, the Tier Manager of the tier then coordinates 608 with the VIM to allocate an RRH for the TPs. In this case, Vim determines 610 to allocate the RRH from the same RRH tier 504 as TP1. TP1 was using RRH instance 1 and TP2 is allocated 612, 614 RRH instance 2.

VIM also communicates 616, 618 with the OBSAI/Openflow switch in order to configure the OBSAI routing such that it is directed to the appropriate RRH tier and instance and the RAN tier can be agnostic of the details. VIM also transmits a message 619 to Tier Manager as a response to request 608. The message carries the details of the RRH resources allocated for the corresponding request.

The Openflow/OBSAI switch takes care of forwarding subsequent communication between the RAN tier and the RRH tier appropriately. The coordination 620 between the transmission points (Pcell and Scell) is considerably simplified since the interactions occur within the same RAN tier 500. OBSAI message switching happens 622, 624 after the OpenFlow control.

Figure 5C:
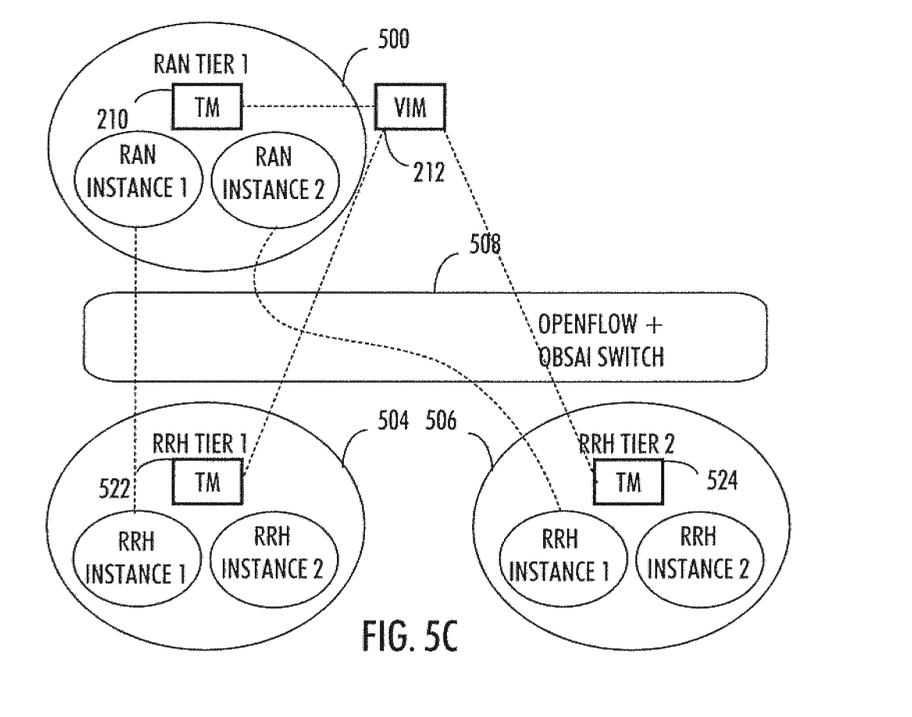

FIG. 5C illustrates a case where some of the benefits of the Cloud based architecture can be utilized. In this case, both TP1 and TP2 are assumed to be allocated on RAN tier 1 500. RRH instance 1 on RRH tier 1 504 is used. However, the best RRH to serve the UE is determined to be RRH Instance 1 of RRH Tier 2 506. Effectively, this means that the RAN uses a single RAN tier 500 and two RRH tiers 504, 506 to communicate with the UE.

Figure 6B:
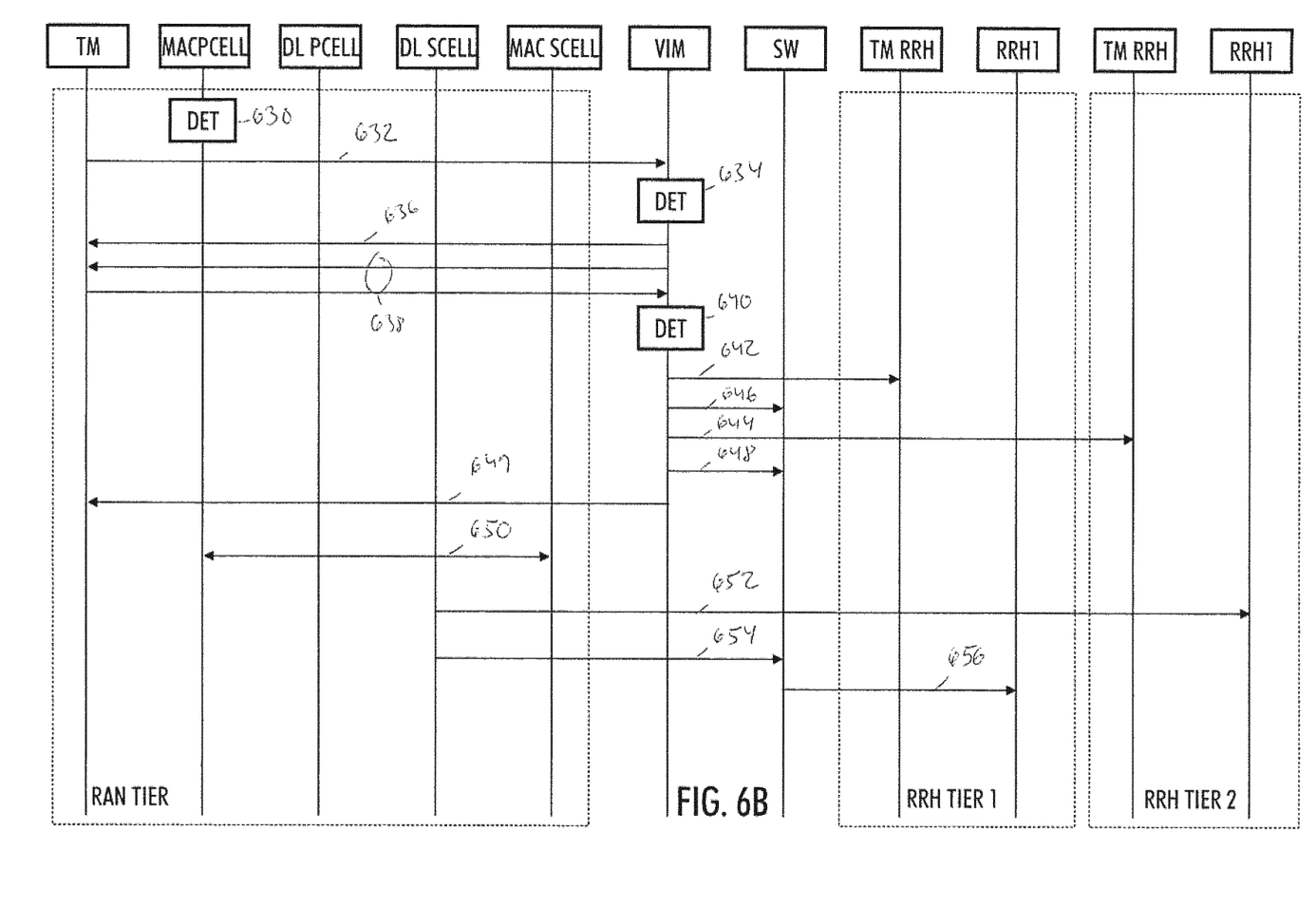

The signalling chart of FIG. 6B illustrates an example of possible signal flow for this case. The signalling chart is simplified and not all possible signalling messages are shown.

Also this example begins with the UE already attached and with TP1 allocated on RAN tier 1 500. The best transmission points (TP) for the user terminal are determined 630 by specific Radio Resources Management RRM algorithms in RAN instance and tier manager and the VIM. The Tier Manager on RAN Tier 1 initiates a request 632 in order to coordinate with the VIM to allocate an additional RAN Tier for the UE for DPS. In this example, VIM determines 634 the best RAN tier to use and the second TP is allocated 636 on the same RAN tier.

Once the RAN tier has been allocated, the Tier Manager on RAN Tier 1 then coordinates 638 with the VIM to allocate an RRH for the TPs. In this case, the RRH instances are allocated 640 from two different RRH tiers by the VIM. The Tier managers on the RRH tiers are informed 642, 644 of the allocation by the VIM.

The VIM also communicates 646, 648 with the OBSAI/Openflow switch in order to configure the OBSAI routing such that it is directed to the appropriate RRH tier and instance and the RAN tier can be agnostic of the details.

VIM also transmits a message 649 to Tier Manager as a response to request 638. The message carries the details of the RRH resources allocated for the corresponding request.

The Openflow/OBSAI switch takes care of forwarding subsequent communication between the RAN tier and the RRH tier appropriately. The coordination 650 between the transmission points (Pcell and Scell) is considerably simplified since the interactions occur within the same RAN tier 500. OBSAI message switching happens 652, 654, 656 after the OpenFlow control.

Figure 5D:
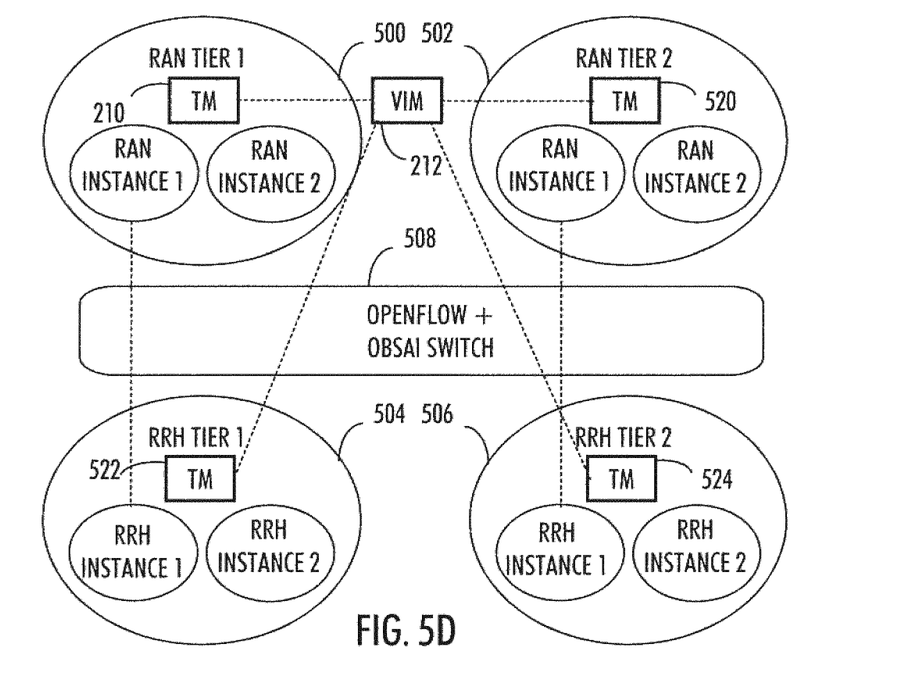

FIG. 5D illustrates a case where each TP is on a different RAN Tier and a different RRH. In this case, both TP1 is allocated on RAN tier 1 500 and TP2 is allocated on RAN tier 2 502. RRH instance 1 on RRH tier 1 504 is used by TP1 and TP2 uses RRH Instance 1 of RRH Tier 2 506. No resources are shared between the two TPs and they are on two distinct set of hardware entities. This scenario is the closest to the state of the art today based on the conventional RAN architecture. This is the equivalent of having the two TPs on two distinct cell sites in the conventional RAN.

Figure 6C:
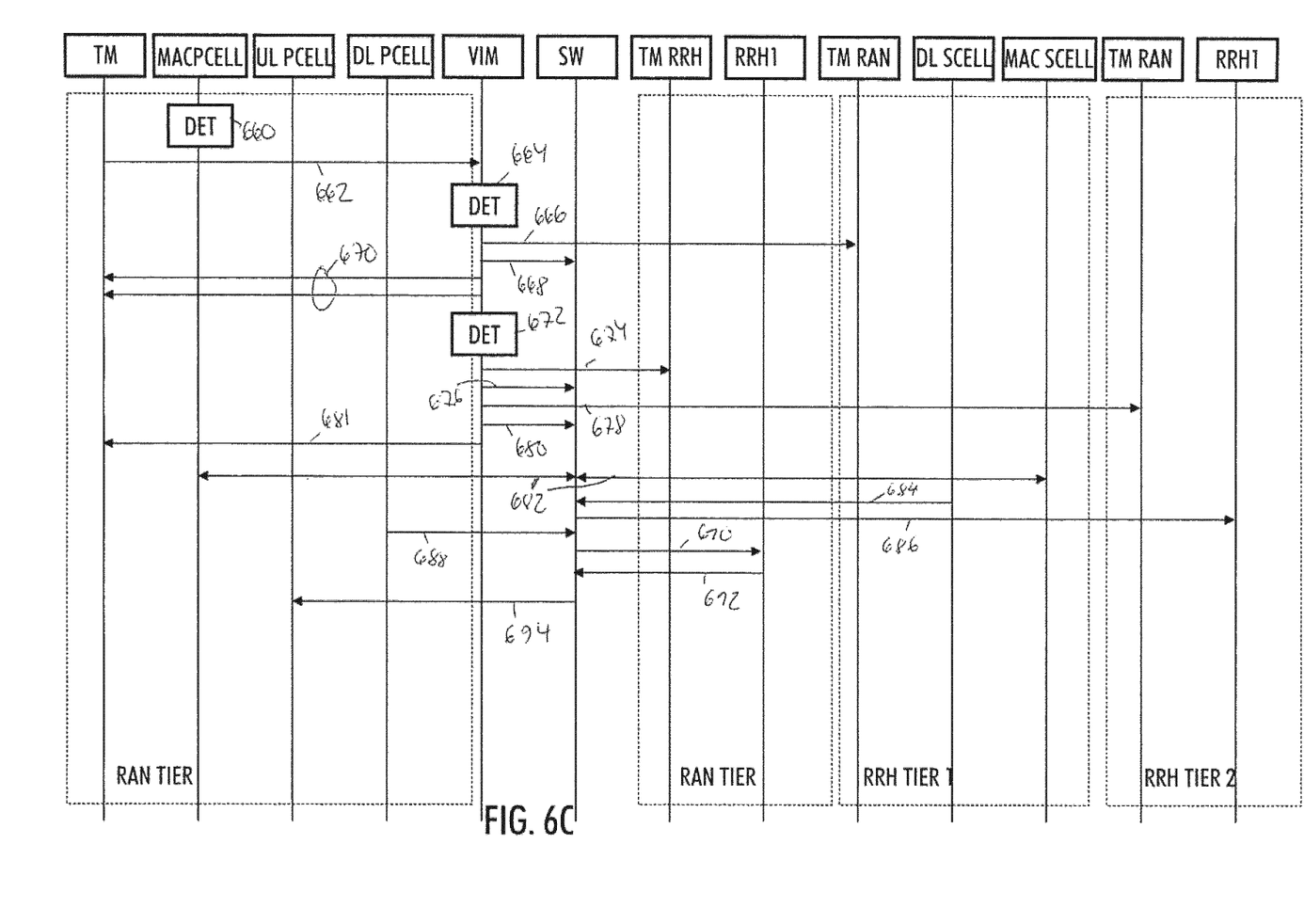

The signalling chart of FIG. 6C illustrates an example of possible signal flow for this case. The signalling chart is simplified and not all possible signalling messages are shown.

Also this example begins with the UE already attached and with TP1 allocated on RAN tier 1 500. The best transmission points (TP) for the user terminal are determined 660 by specific Radio Resources Management RRM algorithms in RAN instance and tier manager. The Tier Manager on RAN Tier 1 initiates a request 662 in order to coordinate with VIM to allocate an additional RAN Tier for the UE for DPS. In this example, VIM determines 664 that RAN Tier instance 2 is best suited to host TP2 and allocates 666 this to TP2. Subsequently, the Openflow switch is also configured 668 to forward the inter RAN Tier signalling messages correctly.

Once the RAN tier has been allocated, the Tier Manager on RAN Tier 1 is configured to coordinate 670 with the VIM to allocate an RRH for the TPs. The message 700 may carry the details of the RAN resources allocated for the corresponding request. In this example, the RRH instances are allocated 672 from two different RRH tiers 504, 506 by VIM. The Tier managers on the RRH tiers are informed 674, 676 of the allocation by VIM.

VIM also communicates 678, 680 with the OBSAI/Openflow switch in order to configure the OBSAI routing such that it is directed to the appropriate RRH tier and instance and the RAN tier can be agnostic of the details.

VIM also transmits a message 681 to Tier Manager as a response to request 670. The message carries the details of the RRH resources allocated for the corresponding request.

The Openflow/OBSAI switch takes care of forwarding subsequent communication between the two RAN tiers and the two RRH tier appropriately. In this example case, since the two TPs are allocated to two different RAN tiers 500, 502 and two different RRH tiers 504, 506, the amount of inter-component messaging 682 increases and is similar to levels in a conventional RAN architecture.

OBSAI message switching 684, 686, 688, 690 and the uplink OBSAI message switching 692, 692 to PCELL happen after OpenFlow control. PDSCH(OBSAI)—Physical Downlink Shared Channel is a channel carrying user bearer data on the LTE downlink. Messages 684, 686 indicate the flow of the PDSCH bearer data from the RAN tier to the RRH tier over OBSAI. PDCCH(OBSAI)—Physical Downlink Control Channel] is a channel carrying control information on the LTE downlink. Messages 688, 670 indicate the flow of the PDCCH control information from the RAN tier to the RRH tier over OBSAI. PUCCH & PUSCH (OBSAI)—Physical Uplink Control Channel & Physical Uplink Shared Channel are LTE uplink channels containing the uplink control information and bearer data respectively. Messages 692, 694 indicate the flow of the PUCCH & PUSCH data received at the RRH being sent over OBSAI towards the RAN.

Even in this example case, the introduction of the Opeflow/OBSAI combined switching fabric helps this solution perform slightly better than the conventional solution.

In this case since the two TPs are allocated to two different RAN tiers and two different RRH tiers, the amount of inter-component messaging increases and is similar to levels in a conventional RAN architecture.

In an embodiment, the RAN tier, the RRH tier and their interconnectivity is based on latency constraints, location and adjacency among other criterion. It is therefore likely that in most cases when using this architecture, the case scenario of FIGS. 5B and 6A will prevail which minimizes the overheads of inter-component messaging. However, the scenarios like in FIGS. 5C and 6B cannot be ruled out due to the vagaries of network configuration based on local situations or based on mobility scenarios that take the UE in and out of the best case scenario of FIGS. 5B and 6A.

Embodiments of invention create the framework and provides the mechanisms that allow the cloud based access network to optimize the resource allocation for a particular UE such that it has optimal resources for as long as possible. The mechanisms outlined above allow the cloud based RAN to make optimizations for a specific user while also being able to evaluate the overall network condition and balancing resources to allocate resources optimally from a network perspective as well.

Figure 7:
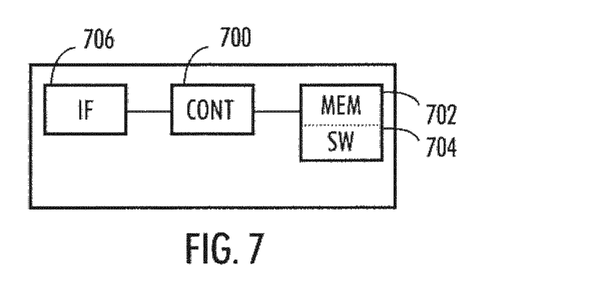
FIG. 7 illustrates an example of an apparatus employing some embodiments of the invention.

FIG. 7 illustrates an embodiment. The figure illustrates a simplified example of an apparatus in which embodiments of the invention may be applied. The apparatus of an example embodiment need not be the entire apparatus, but may be a component or group of components of the apparatus in other example embodiments. In some embodiments, the apparatus is a computing device.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

A processor or control circuitry 700 is configured to execute instructions and to carry out operations associated with the apparatus. The processor 700 may comprise means, such as a digital signal processor device, a microprocessor device, and circuitry, for performing various functions including, for example, one or more of the functions described in conjunction with FIGS. 1 to 6. The processor or control circuitry 700 may control the reception and processing of input and output data between components of the apparatus by using instructions retrieved from memory. The processor or control circuitry 700 can be implemented on a single-chip, multiple chips or multiple electrical components. Some examples of architectures which can be used for the processor or control circuitry 700 include dedicated or embedded processor, and ASIC.

The processor or control circuitry 700 may comprise functionality to operate one or more computer programs 704. Computer program code may be stored in a memory 702. The at least one memory and the computer program code may be configured to, with the at least one processor, cause the apparatus to perform at least one embodiment including, for example, one or more of the functions described in conjunction with FIGS. 1 to 6. Typically the processor 702 operates together with an operating system to execute computer code and produce and use data.

By way of example, the memory 702 may include non-volatile portion, such as EEPROM, flash memory or the like, and a volatile portion, such as a random access memory (RAM) including a cache area for temporary storage of data. The information could also reside on a removable storage medium and loaded or installed onto the apparatus when needed.

The apparatus may comprise an interface 706 for communicating with other apparatuses or network devices. The apparatus may operate with one or more communication protocols.

The apparatus may comprise also further units and elements not illustrated in FIG. 7, such as further interface devices, a power unit or a battery, for example.

In an embodiment, the apparatus of FIG. 7 is a tier manager configured to gather and maintain information on a tier comprising given resources operationally connected to a set of remote radio heads and configured to process traffic to and from the remote radio heads; control the usage of the tier resources on different connections and services; and communicate with respective apparatuses controlling other tiers regarding the use of resources of the tiers.

In an embodiment, the apparatus of FIG. 7 is switching mechanism of the cloud configured to communicate with tier manager apparatuses each gathering and maintaining information on a tier comprising given resources operationally connected to a set of remote radio heads and configured to process traffic to and from the remote radio heads and controlling the resources of the tier; communicate with tier manager apparatuses each gathering and maintaining information on a tier comprising given resources configured to process radio access network functions related to traffic to and from the remote radio heads and controlling the resources of the tier; relay control signalling between the tier manager apparatuses controlling different tiers.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that can contain or store the instructions for use by or in connection with an instruction execution system, apparatus, or device, such as a computer.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A tier manager apparatus in a radio access network of a communication system in cloud environment, the tier manager apparatus comprising:
   at least one processor; and
   at least one memory including computer program code,
   the at least one memory and the computer program code configured to, with the at least one processor, cause the apparatus at least to:
   gather and maintain information on a tier controlled by the tier manager apparatus, wherein the tier is one of at least two tiers of different levels in the radio access network, wherein the at least two tiers each comprise a remote radio head tier level comprising computing resources operationally connected to a set of remote radio heads and at least one higher level tier level comprising computing resources operationally connected to other tier levels and configured to process traffic to and from the remote radio heads;
   control the usage of the tier computing resources on different connections and services;
   communicate with tier managers controlling other tiers regarding the use of computing resources of the tiers;
   allocate computing resources of the tier for the use of another tier and/or request resources from the tier manager controlling another tier; and
   control dynamic realisation of communication network components as virtual instances utilising the computing resources of the tier.

2. The apparatus of claim 1, the at least one memory and the computer program code configured to, with the at least one processor, cause the apparatus, further to: maintain information regarding processing capabilities and current load of the computing resources of the tier.

3. The apparatus of claim 1, the at least one memory and the computer program code configured to, with the at least one processor, cause the apparatus, further to: generate statistics related to computing resource usage, resource operation and properties and quality of connections utilising resources of the tier.

4. The apparatus of claim 1, the at least one memory and the computer program code configured to, with the at least one processor, cause the apparatus, further to: denote an instance as active or non-active and activate or deactivate the interconnection between different tier instances.

5. The apparatus of claim 1, the at least one memory and the computer program code configured to, with the at least one processor, cause the apparatus, further to: monitor the availability of the computing resources of the tier and control the usage of resources based on the availability.

6. The apparatus of claim 1, the at least one memory and the computer program code configured to, with the at least one processor, cause the apparatus, further to determine computing resources needing maintenance or updating, and inform communication network of the need.

7. The apparatus of claim 1, the at least one memory and the computer program code configured to, with the at least one processor, cause the apparatus, further to gather and maintain information of computing resources based on location, proximity, latency characteristics and mobility patterns.

8. The apparatus of claim 1, the at least one memory and the computer program code configured to, with the at least one processor, cause the apparatus, further to structure a relationship between other respective tier managers to form a hierarchy consisting of parent, sibling and child nodes based on functionality or location of the tier managers within a radio access network (RAN) tier.

9. A method for operating a tier manager in a radio access network of a communication system in cloud environment, the method comprising:
   gathering and maintaining information on a tier controlled by the tier manager, wherein the tier is one of at least two tiers of different levels in the radio access network, wherein the at least two tiers each comprise a remote radio head tier level comprising computing resources operationally connected to a set of remote radio heads and at least one higher level tier level comprising computing resources operationally connected to other tier levels and configured to process traffic to and from the remote radio heads;

controlling the usage of the tier computing resources on different connections and services;

communicating with tier managers controlling other tiers regarding the use of computing resources of the tiers;

allocating computing resources of the tier for the use of another tier and/or request resources from the tier manager controlling another tier; and controlling dynamic realisation of communication network components as virtual instances utilising the computing resources of the tier.

10. The method of claim 9, further comprising: maintaining information regarding processing capabilities and current load of the computing resources of the tier.

11. The method of claim 9, further comprising: generating statistics related to computing resource usage, resource operation and properties and quality of connections utilising resources of the tier.

12. The method of claim 9, further comprising: denoting an instance as active or non-active and activating or deactivating the interconnection between different tier instances.

13. The method of claim 9, further comprising: monitoring the availability of the computing resources of the tier and control the usage of resources based on the availability.

14. The method of claim 9, further comprising: determining computing resources needing maintenance or updating, and inform communication network of the need.

15. The method of claim 9, further comprising: gathering and maintaining information of computing resources based on location, proximity, latency characteristics and mobility patterns.

16. The method of claim 9, further comprising: structuring a relationship between other respective tier managers to form a hierarchy consisting of parent, sibling and child nodes based on functionality or location of the tier managers within a RAN tier.

17. A non-transitory computer-readable medium comprising program instructions for execution by a tier manager apparatus in a radio access network of a communication system in cloud environment, the program instructions, when loaded into the apparatus, execute a computer process comprising:

gathering and maintaining information on the tier controlled by the tier manager apparatus, wherein the tier is one of at least two tiers of different levels in the radio access network, wherein the at least two tiers each comprise a remote radio head tier level comprising computing resources operationally connected to a set of remote radio heads and at least one higher level tier level comprising computing resources operationally connected to other tier levels and configured to process traffic to and from the remote radio heads;

controlling the usage of the tier computing resources on different connections and services;

communicating with tier managers controlling other tiers regarding the use of computing resources of the tiers;

allocating computing resources of the tier for the use of another tier and/or request resources from the tier manager controlling another tier; and controlling dynamic realisation of communication network components as virtual instances utilising the computing resources of the tier.

\* \* \* \* \*